United States Patent [19]
Bugaj

[11] Patent Number: 5,349,281
[45] Date of Patent: * Sep. 20, 1994

[54] BATTERY CHARGING SYSTEM AND METHOD OF USING SAME

[75] Inventor: Julian J. Bugaj, Escondido, Calif.

[73] Assignee: HM Electronics, Inc., San Diego, Calif.

[*] Notice: The portion of the term of this patent subsequent to Jan. 5, 2010 has been disclaimed.

[21] Appl. No.: 952,304

[22] Filed: Sep. 28, 1992

Related U.S. Application Data

[63] Continuation of Ser. No. 673,939, Mar. 22, 1991, Pat. No. 5,177,427.

[51] Int. Cl.$^5$ ............................................. H02J 7/00
[52] U.S. Cl. .................................... 320/14; 320/20; 320/21; 320/31
[58] Field of Search ................. 320/5, 6, 14, 15, 20, 320/21, 22, 23, 24, 31, 32, 37, 38, 39, 40

[56] References Cited

U.S. PATENT DOCUMENTS

| | | | |
|---|---|---|---|
| 3,794,905 | 2/1974 | Long | 320/20 |
| 3,886,427 | 5/1975 | Long | 320/72 |
| 3,887,858 | 6/1975 | Burkett et al. | 320/31 |
| 4,118,611 | 10/1978 | Siekierski et al. | 320/40 |
| 4,163,934 | 8/1979 | Lawn | 320/23 |
| 4,270,080 | 5/1981 | Kostecki | 320/24 |
| 4,302,714 | 11/1981 | Yefsky | 320/5 |
| 4,342,954 | 8/1982 | Griffith | 320/14 |
| 4,354,148 | 10/1982 | Tada et al. | 320/20 |
| 4,388,582 | 6/1983 | Saar et al. | 320/20 |
| 4,392,101 | 7/1983 | Saar et al. | 320/20 |
| 4,394,612 | 7/1983 | Emerle et al. | 320/31 |
| 4,439,719 | 3/1984 | Lambert et al. | 320/31 |
| 4,503,378 | 5/1985 | Jones et al. | 320/20 |
| 4,609,560 | 9/1986 | Fasen | 320/14 |
| 4,639,655 | 1/1987 | Westhaver et al. | 320/14 |
| 4,668,901 | 5/1987 | Furukawa | 320/31 |
| 4,710,694 | 12/1987 | Sutphin et al. | 320/21 |
| 4,742,290 | 5/1988 | Sutphin et al. | 320/21 |
| 4,746,852 | 5/1988 | Martin | 320/20 |
| 4,746,854 | 5/1988 | Baker et al. | 320/40 |
| 4,767,977 | 8/1988 | Fasen et al. | 320/20 |
| 4,806,840 | 2/1989 | Alexander | 320/20 |
| 5,182,509 | 1/1993 | Simmonds | 320/14 |

FOREIGN PATENT DOCUMENTS

| | | | |
|---|---|---|---|
| 8805222 | 7/1988 | European Pat. Off. | 320/23 |
| 0074127 | 3/1990 | Japan | 320/37 |

*Primary Examiner*—Kristine L. Peckman
*Attorney, Agent, or Firm*—Bernard L. Kleinke; Jerry R. Potts

[57] ABSTRACT

A battery charging system which prevents false switching from a fast charge mode to a trickle charge mode due to low frequency voltage aberration signals. The battery charging system includes a battery voltage analyzer and a plurality of battery charging and conditioning units for charging different types and kinds of nickel cadmium batteries. Firmware in the microprocessor rejects low frequency aberrations permitting a desired voltage signal to be produced which is indicative of the actual battery potential for charge switching purposes.

20 Claims, 11 Drawing Sheets

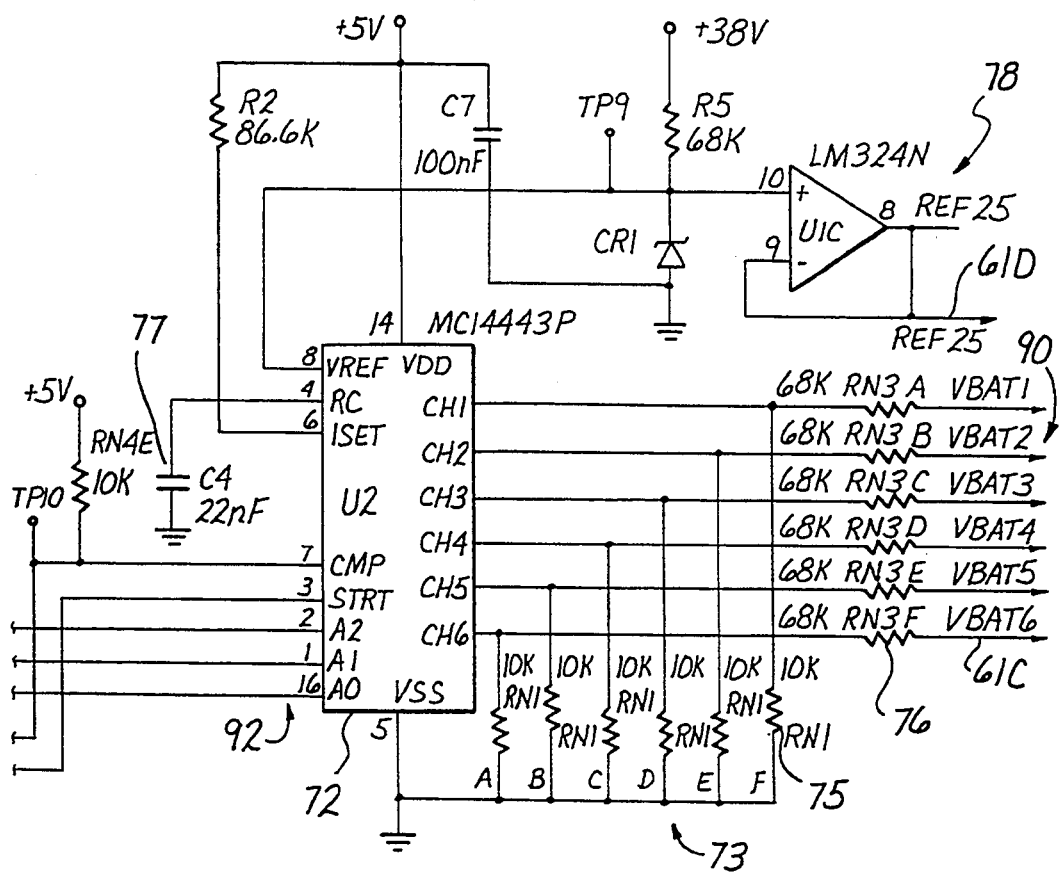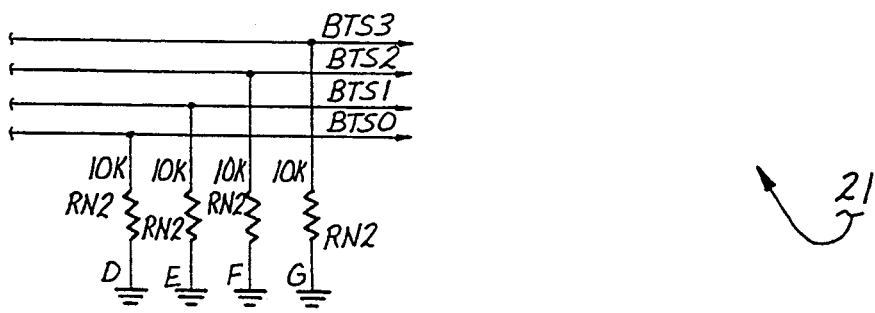
Fig. 3B

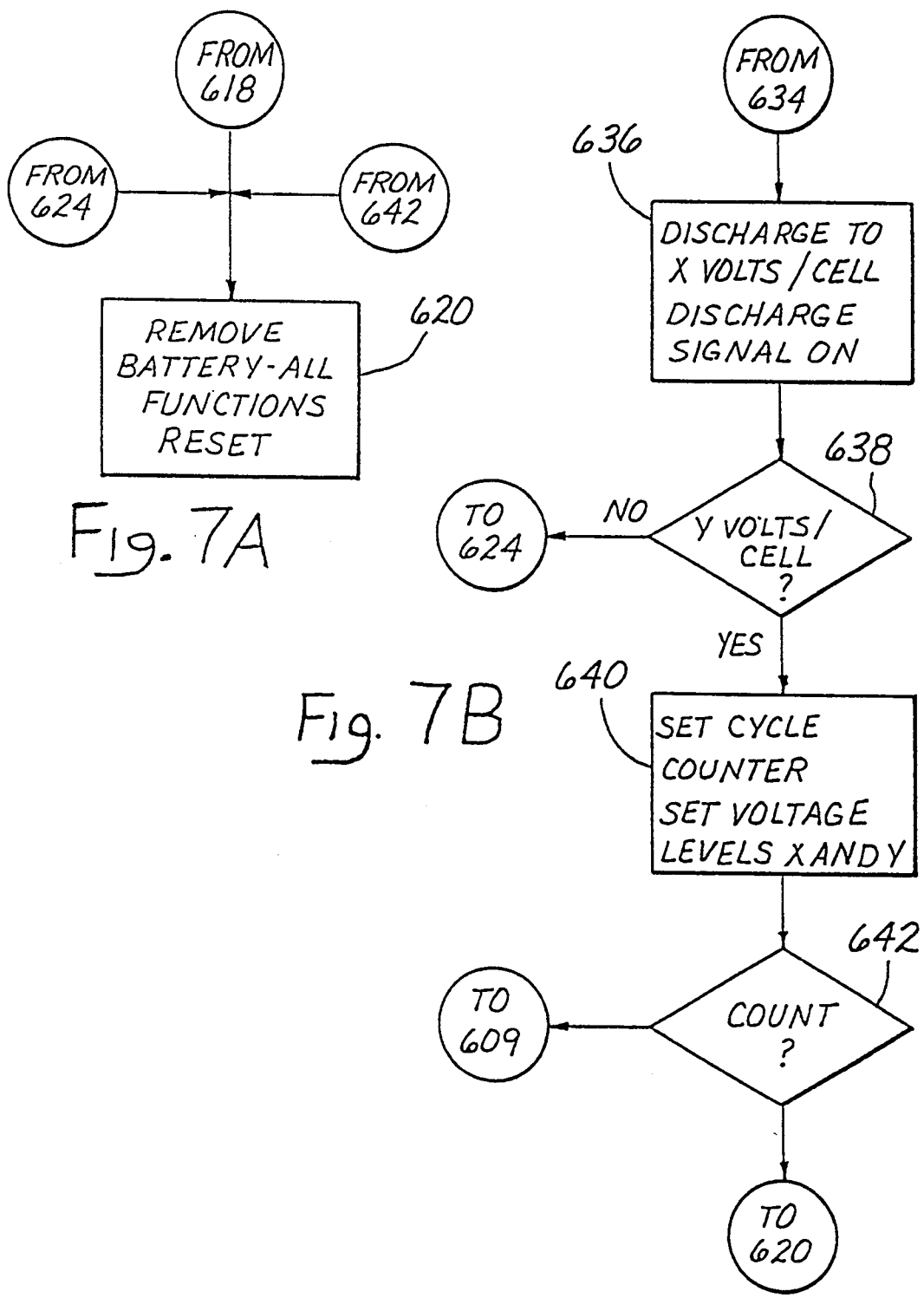

BATTERY CHARGING SYSTEM AND METHOD OF USING SAME

This is a continuation of application U.S. Ser. No. 07/673,939, filed on Mar. 22, 1991, now Pat. No. 5,177,427.

DESCRIPTION

1. Technical Field

The present invention relates in general to battery chargers, and it more particularly relates to a battery charger which helps prevent false switching from fast charge to trickle charge due to voltage aberrations.

2. Background Art

There have been many different types and kinds of battery chargers and battery charging systems. Such systems typically supply a constant high charge current to a battery for charging purposes, while monitoring the potential of the battery as it is being charged to protect the battery from being subjected inadvertently to an excessive charging current that could otherwise cause damage to the battery. For example, reference may be made to the following U.S. Pat. Nos. 3,794,905; 3,886,427; 3,887,858; 4,163,934; 4,270,080; 4,342,954; 4,354,148; 4,388,852; 4,392,101; 4,503,378; 4,394,612; 4,609,860; 4,668,901; 4,710,694; 4,742,290; 4,767,977; and 4,746,852.

Typically, conventional nickel-cadmium batteries while being charged have a voltage-versus-time characteristic that rises slowly from an uncharged state to a fully charged state. Once such a battery has been fully charged, the charging current supplied to the battery must be switched rapidly from a high charge current rate to a slow or trickle charge current rate in order to prevent undesired and unwanted heat build-up in the battery that could cause irreparable damage to the battery and otherwise shorten its useful life.

In order to protect such batteries from being over charged, conventional battery charging systems have used peak detection circuits and the like for determining when the potential of a battery during the charging process has reached its maximum potential value to cause current switching to occur. While such prior known systems and methods have attempted to overcome such excessive heating problems, they have proven to be less than satisfactory for some applications. In this regard, because the voltage-versus-time characteristic curve of a typical battery under charge is not a smooth substantially linear waveform, certain deviations and fluctuations in the voltage characteristics of the battery have caused such prior known systems to detect false peak voltages and thus, in turn, have caused the charging of the battery to be prematurely terminated.

In an attempt to overcome this problem, many prior known battery charging systems have attempted to use microprocessors and analog to digital converters, to cause the switching to occur at a peak charging voltage only. In this regard, computerized techniques have been developed for determining when the voltage-versus-time characteristic curve of a battery has extended beyond a peak voltage value by examining whether the characteristic curve is exhibiting a negative slope.

While such prior known negative slope detecting circuits have tended to help overcome the aforementioned problems, such systems have proven to be less than satisfactory because certain voltage aberrations on the voltage-versus-time characteristic curve tend to produce false indications of a peak voltage, thus causing the microprocessor to evaluate slope characteristics improperly.

The U.S. Pat. No. 4,806,840 discloses an analog to digital converter and microprocessor with a special algorithm for the purpose of attempting to establish with certainty that the voltage-versus-time characteristic has extended well into the negative slope portion of the curve before terminating the charging current. In this regard, the microprocessor firmware required that a negative slope indication be determined on two successive time intervals before enabling the battery charging current to be switched. However, in order to establish when to commence calculating the two successive time intervals, the system firmware still requires the detection of a peak voltage and is still subject to false peak voltage detections due to low frequency aberrations in the battery voltage potential. More particularly, if a battery is improperly secured between the jacks or terminals in a charging station, or the charging equipment is jarred while charging the battery, aberrations can occur and can produce false peak voltage indications.

Therefore, it would be highly desirable to have a new and improved battery charging system which overcomes more satisfactorily the foregoing-mentioned problems associated with signal aberrations occurring during a charging operation. Such a battery charging system, should enable a precise and accurate determination of a peak voltage condition, so that the charging current may be properly switched from a hard charge mode of operation. The charging system should also be relatively simple to operate and maintain, and should be relatively inexpensive to manufacture.

DISCLOSURE OF INVENTION

Therefore, it is the principal object of the present invention to provide a new and improved battery charging system, which prevents or at least greatly reduces false peak voltage detection due to low frequency signal aberrations.

Another object of the present invention is to provide such a new and improved battery charging system, which determines accurately and precisely a peak voltage condition of a battery to prevent, or at least greatly reduce, the possibility of excessive and damaging heat build-up in the battery caused from inadvertently applying a hard charging current for too long a period of time following a peak voltage condition.

Briefly, the above and further objects and features of the present invention are realized by providing a battery charging system which prevents, or at least greatly reduces the possibility of false switching prematurely from a fast charge mode due to voltage aberration signals.

The battery charging system includes a battery voltage analyzer and a charging and conditioning unit for charging different types and kinds of batteries, such as nickel cadmium batteries. The battery analyzer rejects aberrations occurring during the charging process by deriving a voltage signal to be produced which is indicative of the actual battery potential, and then checking the derived voltage signal with the actual battery voltage to determine whether the battery voltage is spurious and a detected peak should be ignored as being false for charge switching purposes.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 3A and 3B are a schematic diagram of a battery analyzer of FIG. 1;

FIGS. 5–10 are flow charges indicative of the firmware of a microprocessor of FIG. 2.

BEST MODE FOR CARRYING OUT THE INVENTION

Figure 1:
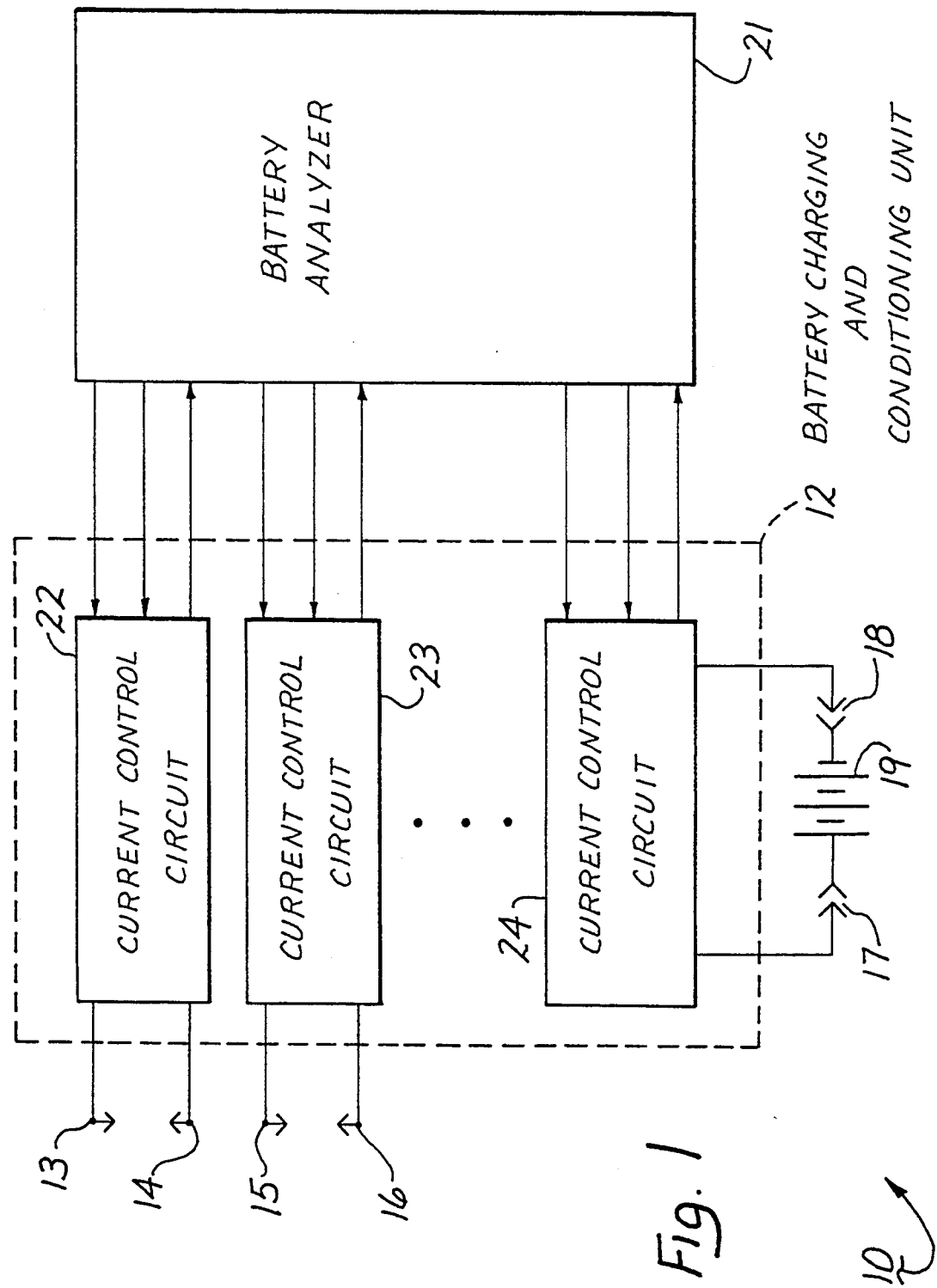
FIG. 1 is a diagrammatic block diagram of a battery charging system which is constructed in accordance with the present invention.

Referring now to the drawings and more particularly to FIG. 1, there is illustrated a battery charger system 10 which is constructed in accordance with the present invention. The battery charger system 10 is electrically energized by a suitable source of electrical power (not shown), such as a power supply connected to an a.c. power line.

The battery charging system 10 generally comprises a battery charging and conditioning unit 12 having a plurality of output terminal adapters or jacks, such as adapters 13–18 for connecting various batteries, such as a battery 19, electrically to the unit 12 for charging purposes. As will be explained hereinafter in greater detail, the charging and conditioning unit 12 causes one or more batteries, such as the battery 19, to be charged by providing a relatively constant current for charging purposes and to be discharged or conditioned for future charging purposes.

For the purpose of determining the value of charging current to be supplied to the battery 19, the battery charging system 10 also includes a battery analyzer 21 for monitoring the voltage of a battery being charged as well as for determining the value of the charging current to be supplied to such a battery. In this regard, during a charging mode of operation, the battery charging and conditioning unit 12, provides a battery voltage conditioned signal, to the analyzer 21, that is indicative of the potential of the battery 19 while its being charged. The battery analyzer 21 responds to the conditioned signal by generating a rate signal for causing the charging and conditioning unit 12 to provide either a constant fast charge current or a constant trickle charge current to the battery 19.

In operation the battery charging system 10 has three modes of operation: a CONDITION mode for preparing a battery, such as the battery 19, to be charged; a charge mode for charging a battery, such as the battery 19; and an ANALYZE mode for determining whether a given battery is defective. Each of these operating modes will be described hereinafter in greater detail.

In the CONDITION mode of operation, a user (not shown) positions the battery 19 between a selected pair of terminals, such as the terminals 17 and 18 of the battery and charging unit 12. Upon the battery being inserted between the terminals 17 and 18, the charging and conditioning unit 12 generates a battery voltage condition signal, such as a VBAT6 signal (FIG. 2), that is coupled to the battery analyzer 21. The battery analyzer 21 responds to the VBAT6 signal by generating a charge mode signal CHRG6 (FIG. 3) as well as a charge rate signal RATE6 for causing the battery charging and conditioning unit 12 to switch to the CONDITION mode of operation for discharging the battery 19 at a relatively fast rate. The conditioned signal, such as the VBAT6 signal (FIG. 2), is indicative of the potential of the battery as it is being discharged. The battery analyzer 21 monitors the conditioned signal VBAT6 until the potential of the battery 19 is at about 1 volt. The analyzer 21 then switches to a charge mode by causing the charge mode signal CHRG6 to go to a logical HIGH level. The analyzer 21 also causes the RATE6 signal to go to a logical HIGH level until the battery is fully charged. After the battery is fully charged and a predetermined period of time elapses, the analyzer 21 causes the RATE6 signal to go to a logical LOW level indicative of a trickle charge condition. The unit 12 responds to the RATE6 signal by switching to a trickle charge condition for maintaining the battery 19 in it discharged condition, until it is removed from the charging system 10. When the battery is removed from the charging and conditioning unit 12, the battery analyzer 21 goes to a STANDBY mode to wait for another battery to be inserted between a pair of the battery jacks, such as the jacks 17 and 18.

In the CHARGE mode of operation, a user (not shown) positions the battery 19 between the terminal jacks 17 and 18 of the battery and charging unit 12. Once the battery 19 has been secured in the charging and conditioning unit 12, the unit 12 generates a battery voltage conditioned signal, such as the VBAT6 signal, that is coupled to the analyzer 21 to advance the analyzer 21 from its STANDBY mode to a CHARGE mode. In this regard, the analyzer 21 cause both the rate signal, such as the RATE6 signal, and the charge mode signal, such as the CHRG6 signal, to both go to a logical HIGH level. The battery charging and conditioning unit 12 responds to the RATE6 and CHRG6 signals by causing a relative constant high charge current to be supplied to the battery 19. As the battery 19 is being charged, the conditioning unit 12 continues to generate the battery voltage condition signal VBAT6 that is coupled to the analyzer 21. In response to receiving the conditioning signal VBAT6, the analyzer 21 converts the analog VBAT6 signal to a digital signal and then computes a derived battery voltage signal using a linear time varying causal equation defined generally by $Y_n = a*X + b*Y_o$ where: $Y_n$ is the derived battery voltage, "a" and "b" are arbitrary constant coefficient factors derived for steady state conditions; X is an old or previously derived battery voltage; and $Y_o$ is the instantaneous potential value of a present battery condition. The derived battery voltage is indicative of a filtered battery voltage over a predetermined period of time. The analyzer 21 then transmits the filtered battery voltage from a binary format into a decimal format and then stores the derived battery voltage. Thereafter, the analyzer 21 periodically calculates the derived voltage of the battery utilizing an algorithm that automatically rejects aberration voltages in determining the derived voltage. When the derived voltage is calculated during the next sampling period, the present derived battery potential is compared with the previously stored derived battery potential to determine whether the present potential value of the battery is greater than the previously stored battery potential value. This process, as will be explained hereinafter in greater detail, is repeated until a peak derived voltage is detected.

Once a peak derived voltage is detected, the analyzer 21 then determines whether the derived battery potential has dropped a predetermined potential value established by the number of battery cells contained in the battery 19. In this regard, the jacks or adapter pairs 13, 14 and 15, 16 and 17 and 18 respectively are adapted to receive specific types of batteries, where each adapter pair is configured received a different battery type than any one of the other pair of terminal adapters. In this regard, battery differences are determined by the number of battery cells each battery contains. Based on the foregoing, when the analyzer 21 receives a battery condition signal, such as the VBAT6 signal, from the unit 12, such as the VBAT6 signal, the firmware of the analyzer 21 causes a predetermined potential value to be stored for comparison purposes that is directly related to the type of battery insert into the unit 11 for charging purposes.

When the analyzer 21 determines a given derived battery voltage has dropped from its peak value by the predetermined potential value, the analyzer 21 starts a counting sequence that takes about five minutes to complete. As the counting sequence is progressing, the analyzer 21 continues to calculate the derived battery voltage and to verify whether the battery potential has raised above the predetermined potential value. If the battery potential from the peak value raises above the predetermined potential value or if a new peak potential value is detected, the counting sequence is reset and started again. If the potential difference does not raise above the predetermined potential value, the counting sequence will be completed.

In response to the counting sequence being completed, the analyzer 21 causes the rate signal RATE6 to be switched to a logical LOW level, which in turn, causes the unit 12 to terminate the high charge current and to provide the battery 19 with a relatively constant trickle charge current. Table I, illustrates the relationship between the charge and rate signals, such as CHRG6 and RATE6, and the various modes of operation of the battery charging system 10.

poses. As the current control circuits are otherwise substantially identical to one another, only current control circuit 24 will be described hereinafter in greater detail.

Figure 2:
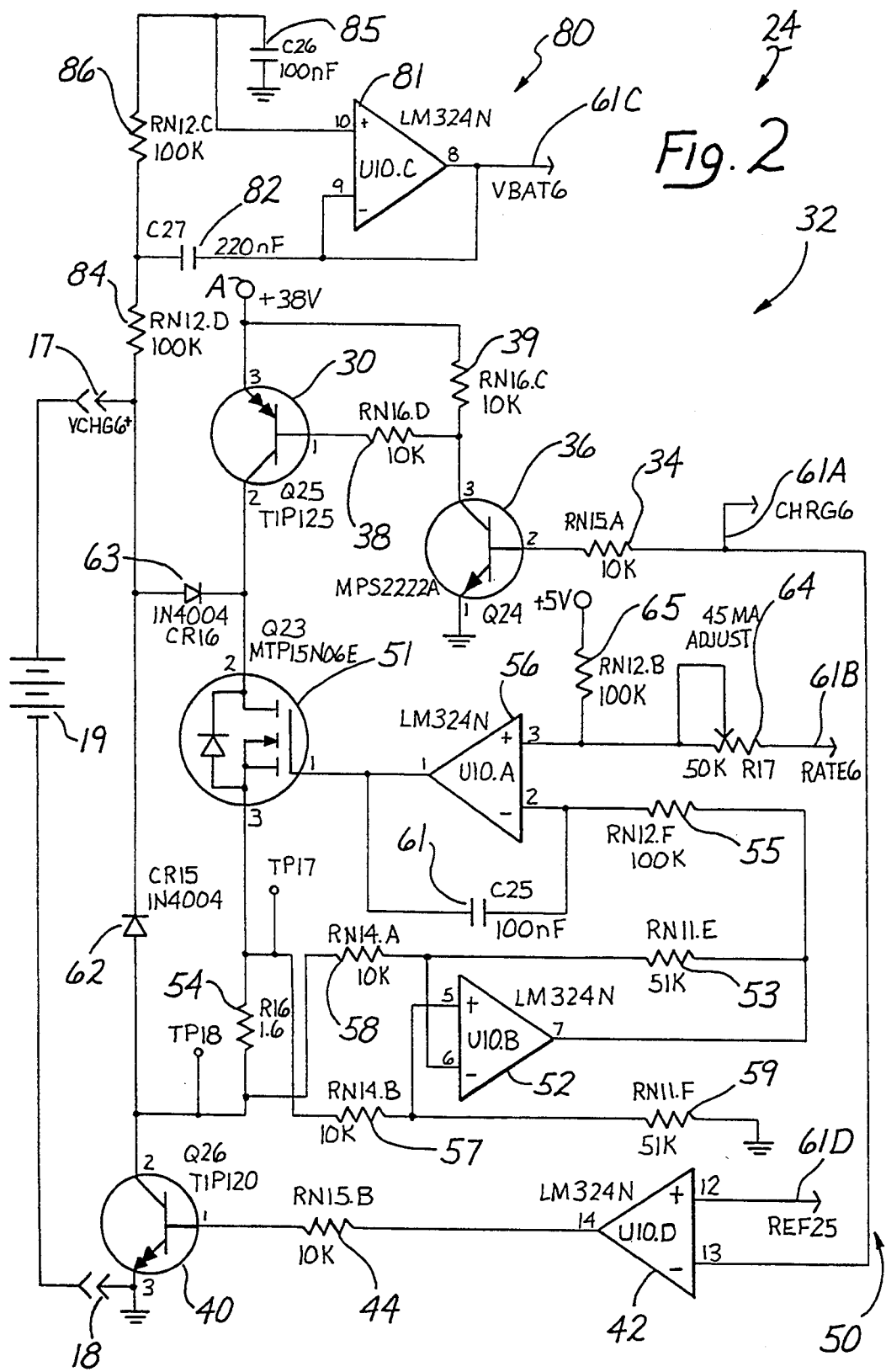
FIG. 2 is a schematic diagram of a current control circuit of FIG. 1.

Considering now the current control circuit 24 in greater detail with reference to FIGS. 1 & 2 the current control circuit 24 generally comprises a pair of transistor switches 30 and 40 that control current flow to or from a battery, such as the battery 19. In this regard, transistor 30 is a current charge switch transistor, while transistor 40 is a current discharge switch transistor. The switch transistors 30 and 40 are TP120 and TP125 type transistor. Both transistors 30 and 40 are controlled by the battery analyzer 21 via the charge mode signal CHRG6. In this regard, the analyzer 21 generates a set of charge mode signals shown generally at 60 and 60A (FIG. 3A) that are coupled to the respective current control circuits, such as circuit 24. For example the CHRG6 signal on a common conductor 61A (FIG. 3A) is coupled between the current control circuit 24 and the analyzer 21.

When the analyzer 21 causes a charge mode signal, such as the charge model signal CHRG6, to rise to a logical HIGH level, the current control circuit 24 switches to a CHARGE mode for enabling the battery 19 to be charged. Conversely, when the charge mode signal CHRG6 drops to a logical LOW level, the current control circuit 24 switches to a CONDITION mode for enabling the battery 19 to be discharged or conditioned for future charging purposes.

As best seen in FIG. 2, the charge mode signal CHRG6 is coupled to the base of transistor 30 through a current drive arrangement shown generally at 32. The CHRG6 signal is also coupled to the base of transistor 40 through an invertor 42 and a current limiting resistor 44. In operation, when the CHRG6 signal is at a logical HIGH level, current is supplied to the base of transistor 30 to establish a positive current path for charging the battery 19 with a constant high or fast charge current as will be explained hereinafter in greater detail. In a similar manner, when the CHRG6 signal is at a logical LOW level, transistor 30 is turned off and current is supplied to the base of transistor 40 to establish a current discharge path from the battery 26.

For the purpose of regulating the current supplied to the battery 19 at either a relatively constant high charge rate or a relatively slow or trickle charge rate, the current control circuit 24 also includes a current regulator, shown generally at 50. The current regulator includes a field effect transistor 51 for controlling current flow and

TABLE I

| MODE OF OPERATION | CHARGE SIGNAL (LOGIC LEVEL OF) | RATE SIGNAL (LOGIC LEVEL OF) |
|---|---|---|
| DISCHARGE | 0 | 1 |
| TRICKLE CHARGE | 1 | 0 |
| FAST CHARGE | 1 | 1 |
| STANDBY | 0 | 0 |

Considering now the battery charging and conditioning unit 12 in greater detail with reference to FIGS. 1 and 2, the battery charging and conditioning unit 12 generally comprises a group of current control circuits, such as current control circuits 22, 23 and 24 for regulating current to and from a group of batteries, such as the battery 19. The current control circuits, such as circuits 22, 23 and 24 are substantially identical to one another except for their terminal adapters for securing removably a battery to the unit 12 for charging pura current sensing differential amplifier 52 for measuring the current flow to or from the battery 19 during the CHARGE and CONDITION modes of operation. In order to enable the current sensing differential amplifier 52 to accurately and precisely measure the current flow, a low impedance resistor 54 is coupled in the current charge and discharge path and across the input to the current sensing differential amplifier 52. The resistor 54 have a very low resistive value so that the voltage across the resistor 54 is substantially proportional to the current flow through the resistor 54. The amplifier 52 is an LM324N type.

The output of the amplifier 52 is coupled via a feedback to the negative input of a path resistor 55 rate or gain control differential amplifier 56 that causes the current flowing through the field effect transistor 51 to be maintained at a constant level. In this regard, the output signal of the differential amplifier 56 enables the current flow through transistor 51 to be adjusted in accordance with a rate control signal supplied by the analyzer 21 as will be explained hereinafter in greater detail. A one hundred picofarad coupling capacitor 61 is coupled between the output of amplifier 56 and the negative input terminal of amplifier 56. The field effect transistor 51 is a MTP 15NO6E transistor while the low impedance resistor 54 is a 1.6 ohm resistor. Amplifier 56 is a LM324N.

Figure 3A:
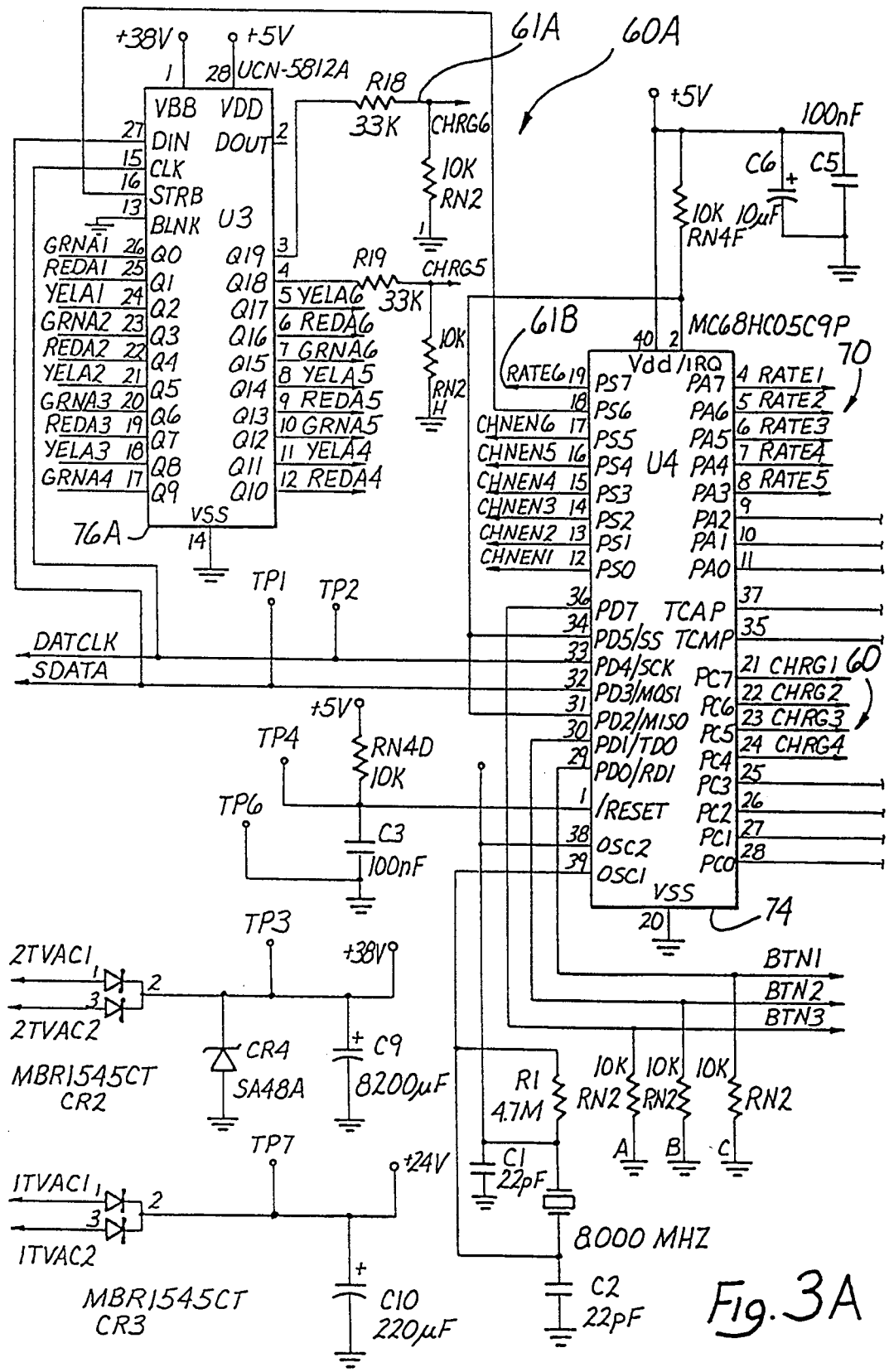

Considering now the current drive arrangement 32 in greater detail with reference to FIGS. 2, 3A and 3B, the current drive arrangement 32 is coupled between the charge mode output CHRG6 terminal of the analyzer 21 and the base of switch transistor 30 via the conductor 61A. The current drive arrangement generally comprises a current limiting resistor 34, a current drive transistor 36 and a current limiting resistor 38. The resistors 34 and 38 are both 10K ohms while the transistor 36 is a MPS2222A transistor.

For the purpose of properly biasing transistor 36, the current drive arrangement 32 also includes a bias resistor 39 coupled between a positive direct current voltage source (not shown) and the collector of transistor 36. The positive d.c. voltage source is also coupled to the emitter of transistor 30. The bias resistor 39 is a 10K ohm resistor.

Considering now the positive current charge path for charging the battery 19 in greater detail with reference to FIG. 2, the positive current path draws current from the positive direct current voltage source at a terminal A, (FIG. 2) through the emitter-collector path of transistor 30 to the field effect transistor 51 and then to the current sensing resistor 54 and through a current steering diode 62 to the output terminal 17. The current steering diode 62 is a 1N4004 diode.

Considering now the negative or discharge current path of the current control circuit control circuit 24 in greater detail with reference to FIG. 2, the discharge current path draws current from the positive terminal of the battery 19 via the jack 17, through the field effect transistor 51 via a current steering diode 63, then to the current sensing resistor 54 and thence to ground through the collector emitter of the transistor 40. The current steering diode 58 is a 1N4004 diode.

Considering now the current regulator 50 in still greater detail with reference to FIG. 2, the low impedance current sensing resistor 54 is coupled across the positive and negative input terminals of the amplifier 52 by a pair of 10K ohm current limiting resistors 57 and 58 respectively. The positive input terminal of amplifier 52 is also coupled to ground through a 51K ohm resistor 59. In order to provide a feedback path for amplifier 52, the output of amplifier 52 is coupled to its negative input via a feedback resistor 53. The feedback resistor 53 is a 51K ohm resistor.

For the purpose of regulating the current flow through the field effect transistor 51 at either a constant high rate or a constant trickle rate, the amplifier 56 supplies a control signal to the transistor 51. In this regard, whenever the voltage level on the negative input terminal is less than the voltage level on the positive terminal of amplifier 56, a control signal is generated at the output of amplifier 56 for permitting more current to flow through the transistor 51 and the current sensing resistor 54.

When the current flow through resistor 54 increases the voltage level at the negative input of amplifier 56 increases via the voltage level signal supplied from the output of amplifier 52. Thus, the voltage level of the negative input to amplifier 56 will continue to increase until the voltage level is the same as the input voltage on the positive input terminal of amplifier 56.

As best seen in FIG. 2, the positive input terminal of amplifier 56 is coupled to one of the rate control signals, RATE6, generated by the analyzer 21 via a conductor 61B and a variable resistor 64. In this regard, the analyzer 21 generates a set of rate control signals shown generally at 70 that are coupled to the respective current control circuits, such as the circuit 24. When the analyzer 21 causes a rate control signal, such as RATE6 to rise to a logical HIGH level, the current control circuit 24 permits a high rate of charge or discharging. In a like manner, when the RATE6 signal is a logical LOW level, the current control circuit 24 permits a trickle rate for maintaining the charge condition of a battery, such as the battery 19. The positive input of amplifier 56 is also coupled to a positive direct current voltage source (not shown) via a pull up resistor 65. Resistor 64 is a 50K ohm variable resistor while resistor 65 is a 100K ohm resistor.

In order to enable the analyzer 21 to properly periodically sample the battery potential of a battery under charge, the current control circuit 24 includes a conventional anti-aliasing circuit, shown generally at 80, for helping to reduce, if not substantially eliminate spurious voltage signals above the preestablished sampling rate of the analyzer 21.

The anti-aliasing circuit 80 generally comprises a LM324N differential amplifier 81 whose negative input terminal is coupled to the positive terminal of the battery 19 via a blocking capacitor 82 and a high impedance resistor 84. The resistor 84 has a high resistive value in order to permit the potential of the battery 19 to be accurately measured. In this regard, the resistor 84 is a 100K ohm resistor, while the capacitor 82 is a 220 picofarad capacitor. In the steady state condition the anti-aliasing circuit 80 generally behaves as a voltage follower with little or no DC error.

The positive terminal of the amplifier 81 is coupled to ground through a 100 picofarad capacitor 85 and to the voltage sensing resistor 84 via a resistor 86. Resistor 86 is also a 100K ohm resistor. As best seen in FIG. 2, the amplifier 81 of the anti-aliasing circuit 80 generates the conditioning signal VBAT6, which is coupled to the analyzer 21 via a conductor 61C. In this regard, each of the other current control circuits, such as the circuits 22 and 24 also generate conditioning signals coupled to the analyzer 21 and shown generally at 90 (FIG. 3B).

Considering now the analyzer 21 in greater detail with reference to FIGS. 3A and 3B, the analyzer 21 generally comprises an analog to digital converter 72 which is addressed by a microprocessor 74 for processing the digital signal supplied by the analog to digital converter for controlling the conditioning and charging of batteries coupled to the conditioning and charging unit 12. The microprocessor 74 supplies a three bit digital signal, shown generally at 92 for selecting a given channel within the converter 72.

For the purpose of providing a user with a visual indication of the various states of the system 10, the battery analyzer 21 also includes an input/output port 76 coupled to the microprocessor 74 for generating the charge mode signals CHRG5 and CHRG6, as well as a number of different drive signals for driving a group of light emitting diodes (not shown) that provide the visual indications of the operating condition and status of the charging system 10.

As best seen in FIGS. 3A and 3B, the microprocessor 74 causes the charge mode signals CHRG1-4, shown generally at 60, as well as the CHRG5-6 signals shown generally at 60A and the rate control signals RATE1-6, shown generally at 70 to be generated for controlling the charging and conditioning unit 11. As the operation of the microprocessor 74 is similar for each of the control circuits 22, 23 and 24, the operation of the microprocessor 74 will be described with reference to the control circuit 24 only.

As best seen in FIGS. 2, 3A and 3B, in order to permit the differential amplifier 42 (FIG. 2) to operate as an invertor, the analyzer 21 also includes a reference voltage circuit, shown generally at 78 that generates a reference voltage signal, REF2.5. The REF2.5 signal is coupled to the control invertors of each of the current control circuits, such as the invertor 42 in control circuit 24 via a conductor 61D. In this regard, although the microprocessor 74 may cause the various charge mode signals, such as CHRG6, to switch between a logical LOW level and a logical HIGH level, the output signals from the control invertors, such as control invertor 42 are further controlled by the REF25 signal.

Considering now the analog to digital converter 72 in greater detail with reference to FIGS. 3A and 3B, the analog to digital converter is a low voltage device coupled between the microprocessor 74 and the various current control circuits, such as current control circuits 22, 23 and 24. For the purpose of enabling the analog to digital converter to accept the relatively high voltage signals from the individual current control circuit, the battery condition signal inputs from each current control circuit are scaled down by a voltage divider network shown generally at 73. In this regard, each condition signal such as the signal VBAT6 passes through a divider network consisting of a 10K ohm resistor 75 and a 68K ohm resistor 76.

In order to produce the reference voltage signal REF25 for use by the individual current control circuits, such as circuits 22, 23 and 25, an output pin 6 of the analog to digital converter 72 is connected to the reference voltage circuit, shown generally at 78.

The analog to digital converter 72 is controlled by the microprocessor 74 that supplies the analog to digital converter 72 with a set of address lines shown generally at 92, for switching between channels for measuring the instantaneous battery voltage potential. As will be explained hereinafter in greater detail, for each battery channel being sampled or measured by the microprocessor 74, the microprocessor measures various instantaneous references for correcting normal system deviations due to loads, heat, and time delays. Thus, the microprocessor 74 measures an instantaneous reference voltage first, then an instantaneous reference ground level, and finally the instantaneous battery potential.

For the purpose of establishing a consistent time period for permitting the microprocessor 74 to sample the instantaneous battery voltages, the analog to digital converter 72 has an output pin 4 connected to a 22 nanofarad discharging capacitor 77. In this regard, when the microprocessor 74 samples the instantaneous values relative to any given battery, it first sends the analog to digital converter 72 a start signal STRT, to cause the capacitor 77 to be charged. As the capacitor 77 is being charged relative to the instantaneous value, the microprocessor 74 is establishing the instantaneous value by counting incremental periods. In this regard, the microprocessor 74 commences the counting sequence when it causes the STRT signal to go to a logical HIGH level and terminates the count when the capacitor 77 is fully discharged. In response thereto, the converter 72 generates a compare signal, CMP.

Once the microprocessor 74 receives the CMP signal, the microprocessor 74 terminates counting and causes the STRT signal to drop to a logical LOW level. When the signal STRT goes to a low level it permits the capacitor 77 to be charged. During the next sampling period, the microprocessor again causes the STRT signal to go to a logical HIGH level to cause the capacitor 77 to again be discharged relative to the next instantaneous value to be. In the next sampling period, instead of addressing the converter 72 to use a 2.5 volts level as a reference value, the microprocessor programs the analog to digital converter to use ground as its reference value. The difference between these two samplings is then utilized to calculate the derived battery voltage for the battery as will be explained hereinafter in greater detail.

Figure 5:
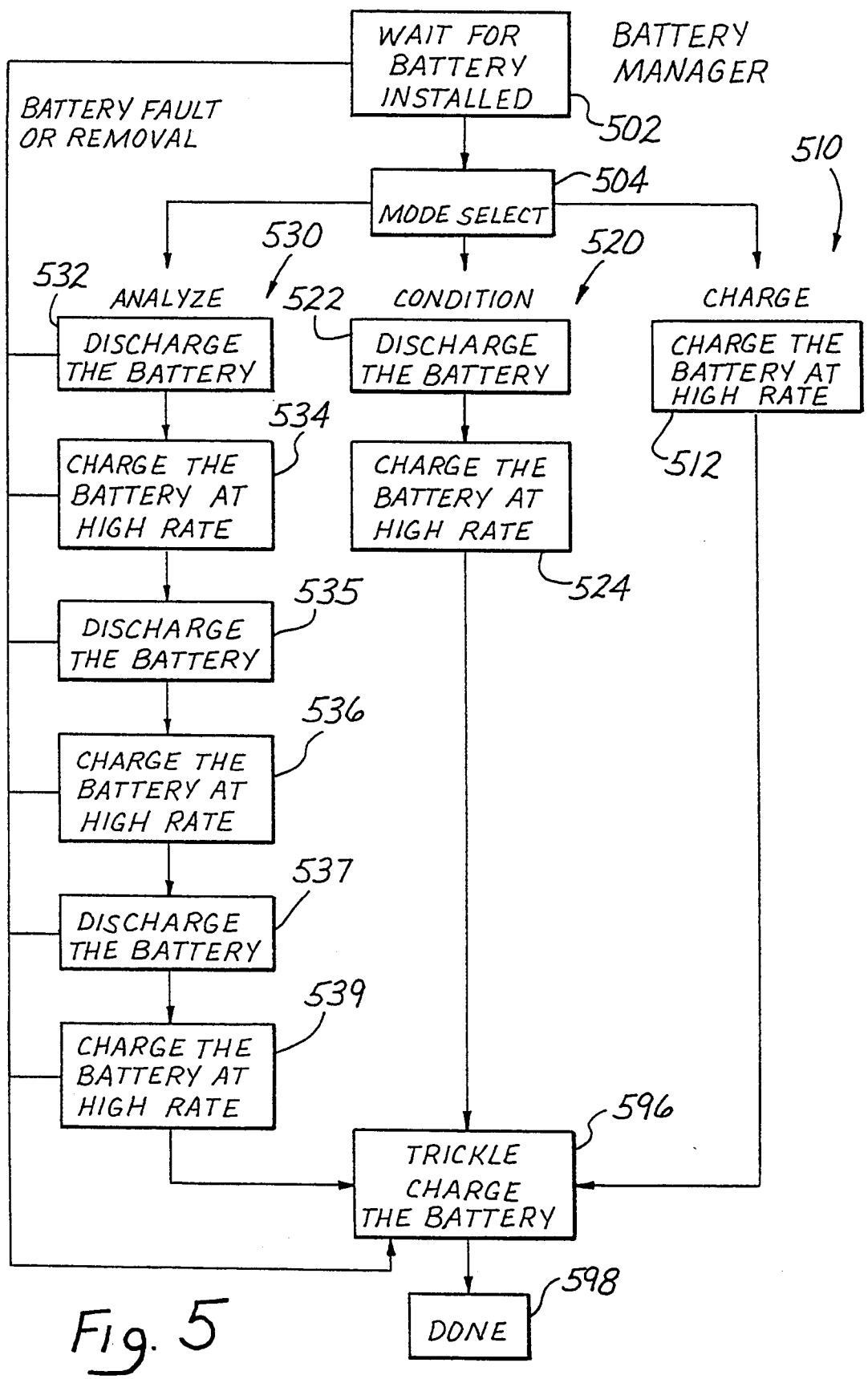

Considering now the microprocessor 74 in greater detail with reference to FIGS. 3A and 3B, the microprocessor 74 evaluates the charge condition of the battery 19 and determines whether it is to be conditioned, charged or analyzed. FIG. 5 is a simplified flowchart, illustrating the steps taken by the processor 74 in determining whether to condition, to analyze or to charge the battery 19. Starting in a STANDBY or wait condition at instruction 502, the system wait at instruction 502 until a battery, such as battery 19 is installed in the conditioning and charging unit 12. When a battery is installed in the unit 12, from a mode selection instruction 504, the system 10 proceeds to either a charge subroutine shown generally at 510, a condition subroutine shown generally at 520, or an analyze subroutine shown generally at 530. In this regard, the battery charging system 10 includes a mode selection switch (not shown) which provides a signal to the microprocessor 74 indicative of the particular mode of operation the user has selected for operating the battery charging system 10.

Although a switch selection method is preferred, it will be understood by those skilled in the art that an automatic mode selection is also possible. In this regard, the microprocessor 74 could be automatically programmed to condition initially a battery for charging by discharging the battery to place it in condition for charging and then charge the battery once it has been discharged.

Considering now the CHARGE mode subroutine 510 in greater detail with reference to FIG. 5, if it is determined at instruction 504 that the CHARGE mode of operation was selected, the system 10 proceeds to the CHARGE mode subroutine 510 by executing the instruction 512 which causes the conditioning and charging unit 12 to charge a selected battery with a fast or high charge current until the selected battery is fully charged. When the battery is fully charged, the system 10 proceeds to instruction 596 to cause the conditioning and charging unit 12 to discontinue the high charge rate of charge and to switch to a low or trickle charge rate for charging the battery. The trickle charge continues until the battery is removed from the conditioning and charging unit 12. When the battery is removed, the system proceeds to instruction 598, for causing the processor 74 to return to the STANDBY mode.

Considering now to the CONDITION mode subroutine 520 in greater detail with reference to FIG. 5, it is determined at instruction 504 that the CONDITION mode of operation was selected, the system 10 advances to the CONDITION mode subroutine 520 by executing the instruction 522 which causes the conditioning and charging unit 12 to discharge a selected battery at a high discharge current rate until the selected battery reaches a predetermined discharged battery potential level.

When the battery is discharged to the predetermined level, the processor 74 executes the instruction 524 to cause the conditioning and charging unit 12 to switch from a discharge mode of operation, to a charge mode of operation, for charging a selected battery with a high rate charge current until the selected battery is fully charged. When the battery reaches a fully charged condition, for a predetermined period of time, the processor executes the instruction 596 which causes the conditioning and charging unit 12 to switch to the trickle charge rate as previously described.

Considering now the ANALYZE mode subroutine 530 in greater detail with reference to FIG. 5, at instruction 504 it is determined that the ANALYZE mode of operation was selected. The processor advances to the ANALYZE mode subroutine 530 by executing the instruction 532. At instruction 532, the conditioning and charging unit 12 discharges the battery until it reaches a first predetermined potential value. If the battery fails to reach the first predetermined battery potential level, or if the battery is removed from the conditioning and charging unit 12, the processor returns to the STANDBY mode at instruction 502 and causes a signal to be generated that the battery is defective or has been removed from the unit 12.

If the battery potential reaches the first predetermined potential value, the processor executes flow chart proceeds to instruction 534 which causes the conditioning and charging unit 12 to switch from a discharging mode of operation to a charging mode of operation. In this regard, the conditioning and charging unit 12 continues to charge the battery until it reaches a second predetermined potential value. If the battery fails to reach the second predetermined potential value, or, if the battery is removed from the unit 12, the STANDBY mode is then entered at instruction 502. A signal is caused to be generated to indicate that the battery is defective or has been removed from the unit 12.

If the battery potential reaches the second predetermined potential value, the instruction 535 is then executed to cause the conditioning and charging unit 12 to switch from a charge mode of operation to a discharge mode of operation for a second time. Discharging of the battery continues until the battery potential reaches a third predetermined value. If the battery fails to reach the third predetermined value, the instruction 502 is then executed as previously described.

If the battery reaches the third predetermined level, the instruction 536 is then executed to cause the conditioning and charging unit 12 to switch to the charging mode for a second time. The charging continues until the battery reaches a fourth predetermined potential value. If the battery fails to reach the fourth predetermined level, instruction 502 is then executed to cause a signal to be generated to indicate that the battery is defective or that the battery has been removed from the unit 12.

If the battery reaches the fourth predetermined level, the processor then executes instruction 537 to cause the battery conditioning and charging unit 12 to switch to the discharge mode of operation for a final time. The unit 12 then continues to discharge the battery until the battery potential reaches a fifth predetermined value. If the battery fails to reach the fifth predetermined value, the instruction 502 is then executed as previously described.

If the battery potential reaches the fifth potential value, the processor then executes instruction 539 which causes the conditioning and charging unit 12 to switch to the charge mode of operation for a final time. In this regard, the conditioning and charging unit 12 continues to charge the battery until the battery potential reaches a sixth predetermined potential level. If the battery fails to reach the sixth predetermined potential level, the program proceeds to instruction 502 as previously described.

If the battery potential reaches the sixth predetermined level, the instruction 596 is then executed to cause the conditioning and charging unit 12 to switch to a trickle charge. The conditioning and charging unit 12 remains in a trickle charge mode until the user removes the battery from the system 10. In this regard, when the user removes the battery form the system 10, the instruction 598 is then executed, thereby returning the system 10 to the STANDBY mode of operation.

Figure 4:
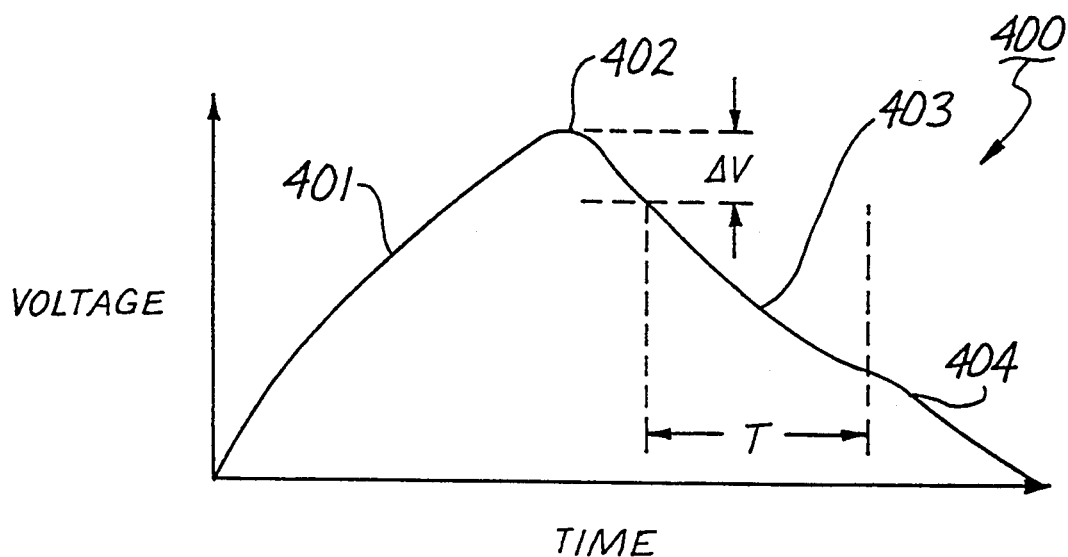
FIG. 4 is a voltage signal diagram representative of the charging voltage characteristic of a typical battery being charged by the battery charging system of FIG. 1.

As best seen in FIGS. 4 and 5, a typical voltage versus time battery charging curve 400 is shown. The characteristic curve 400 has a generally increasing slope portion 401 which occurs during the time the battery is being supplied with a high charge current; a peak voltage occurrence, shown generally at 402 when the battery is fully charged; a decreasing slope portion 403 as the battery continues to be charged with a high charge current following a peak voltage condition; and a relatively constant level portion 404 when the battery is maintained in a fully charged state by a trickle charge current.

FIG. 5 is a greatly enlarged view of a section of the slope portion 401 illustrating that a battery potential signal, such as the VBAT6 signal has a wide range of deviations and fluctuations and may include one or more voltage aberrations (not shown). As will be explained hereinafter, the microprocessor 74 responds to the digitized output signal produced by the analog to digital converter 72 by calculating a derived battery voltage $V_d$, for example a derived voltage shown generally at 502, for the purpose of detecting true peak voltage conditions, as well as calculating a given or predetermined voltage drop $\Delta V$ after the peak potential value $V_p$.

Figure 8:
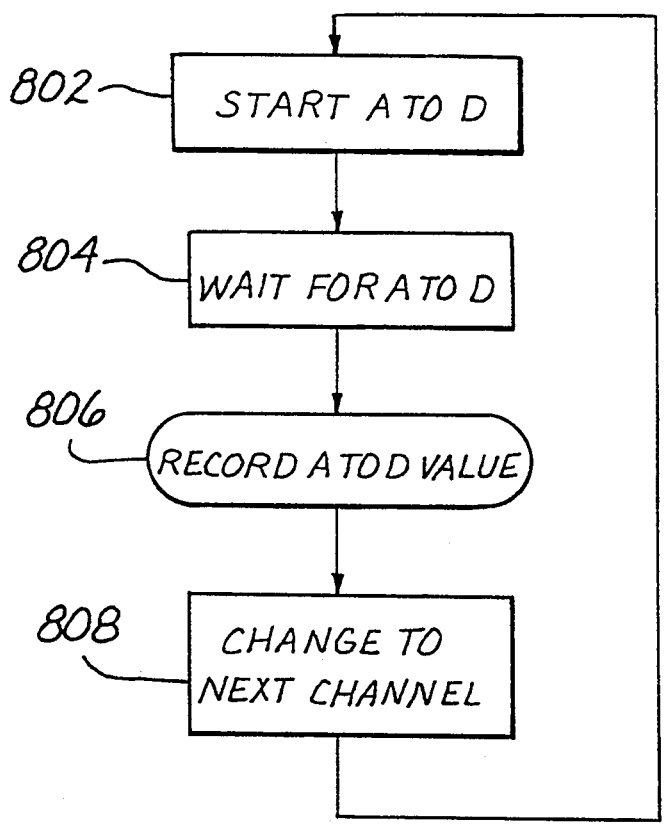
Figure 4A:
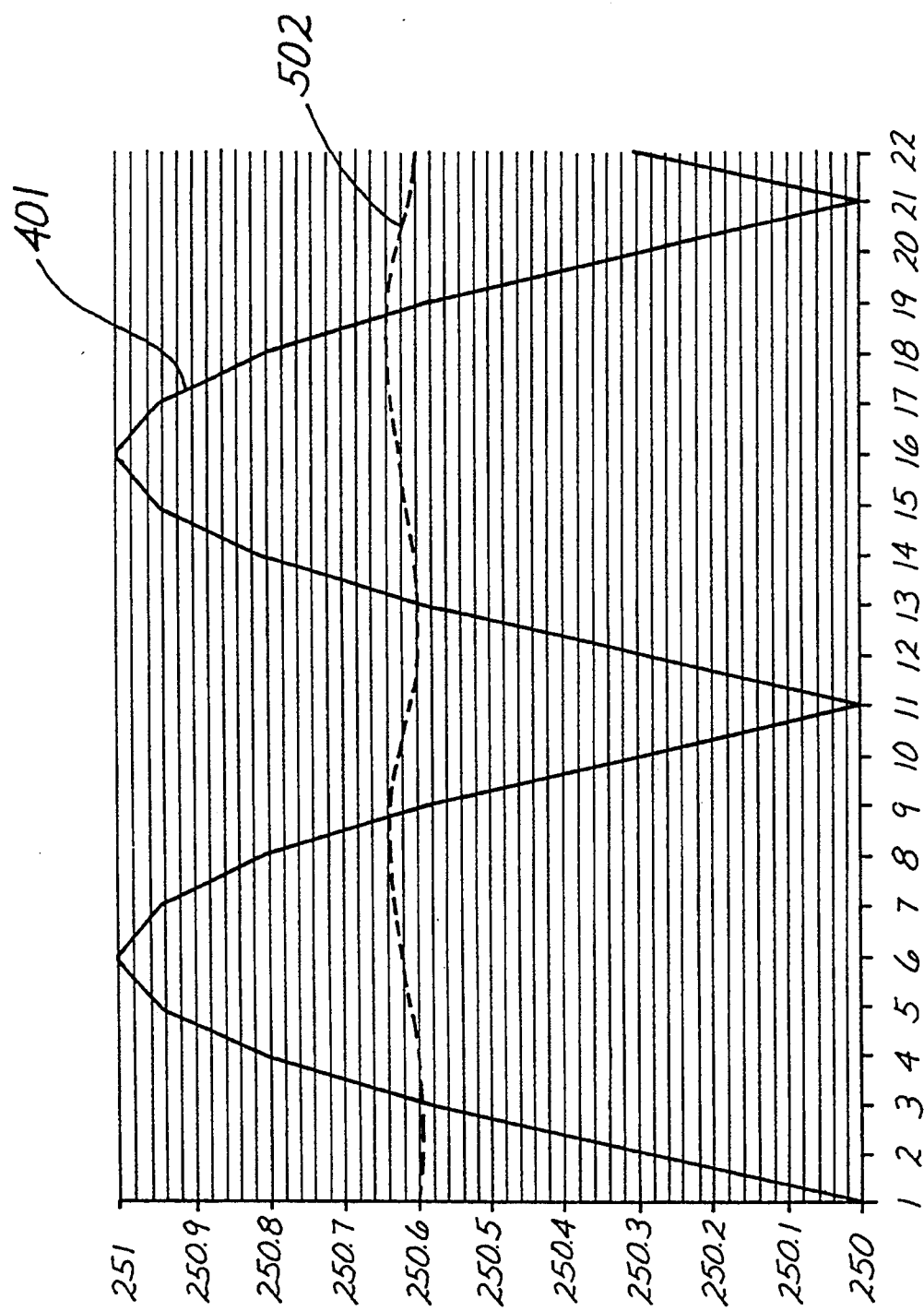
FIG. 4A is a greatly enlarged portion of the signal diagram of FIG. 4 showing the actual battery voltage thereof superimposed with a derived battery voltage.
Figure 6:
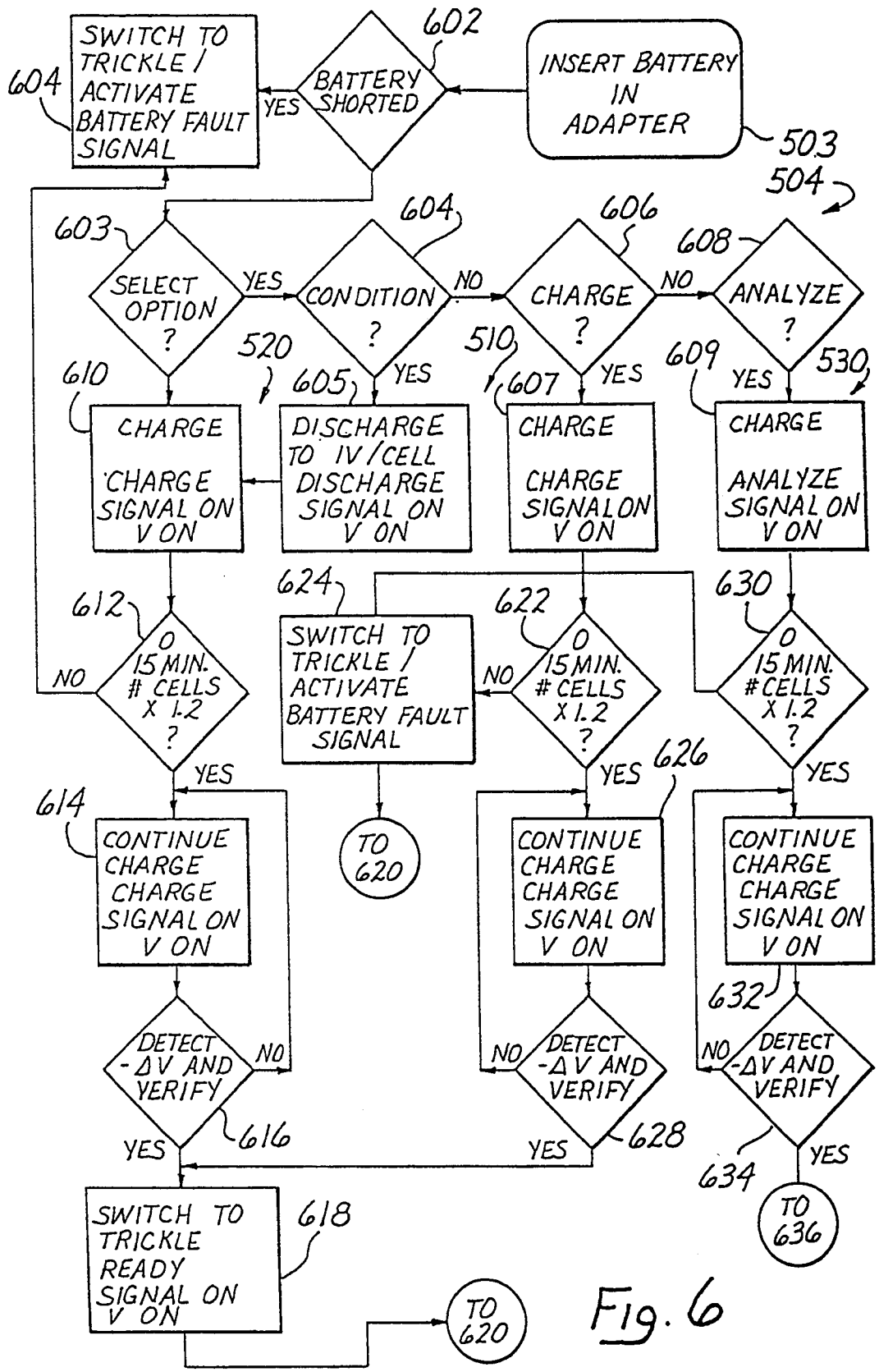
Figure 9:
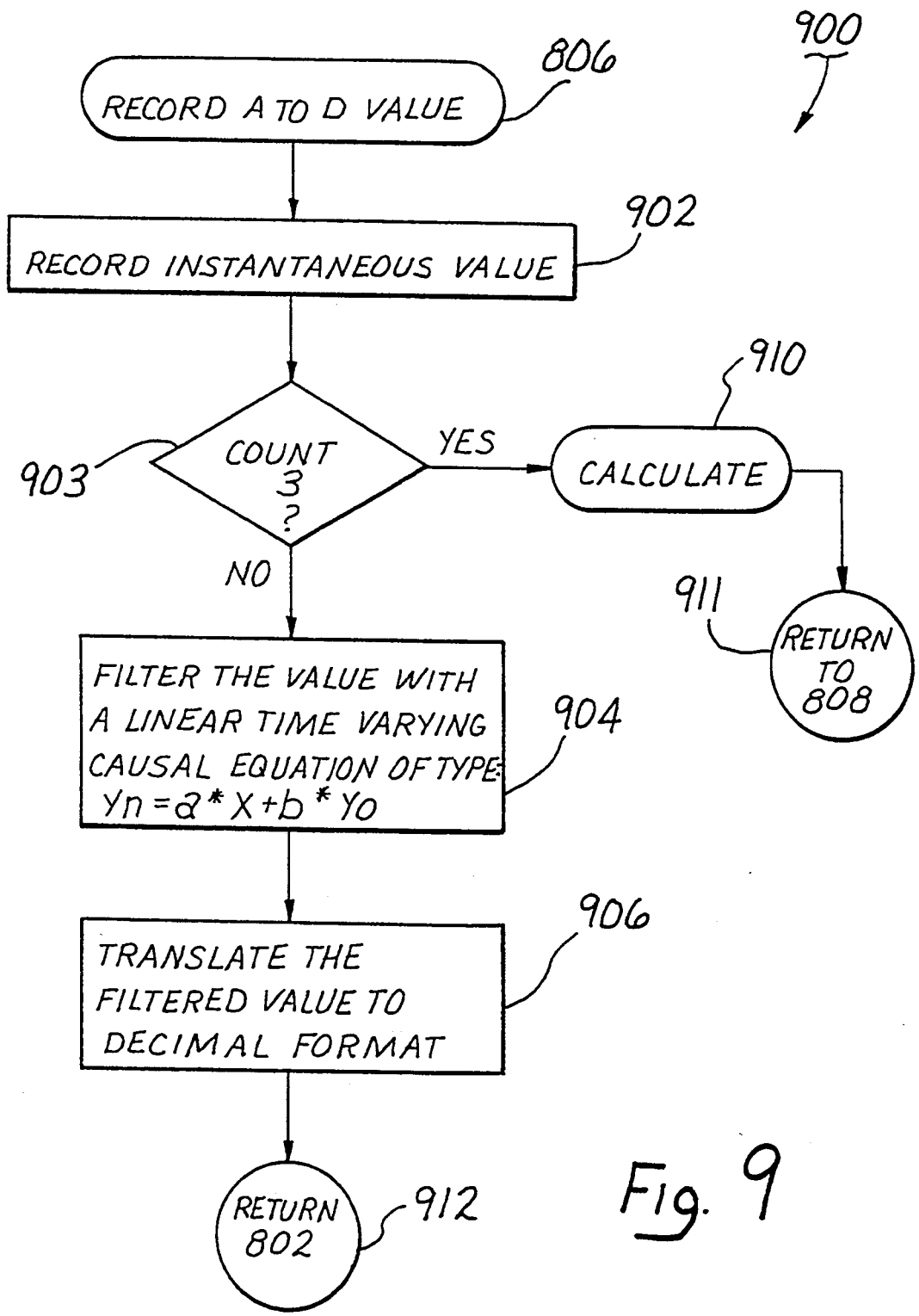
Figure 10:
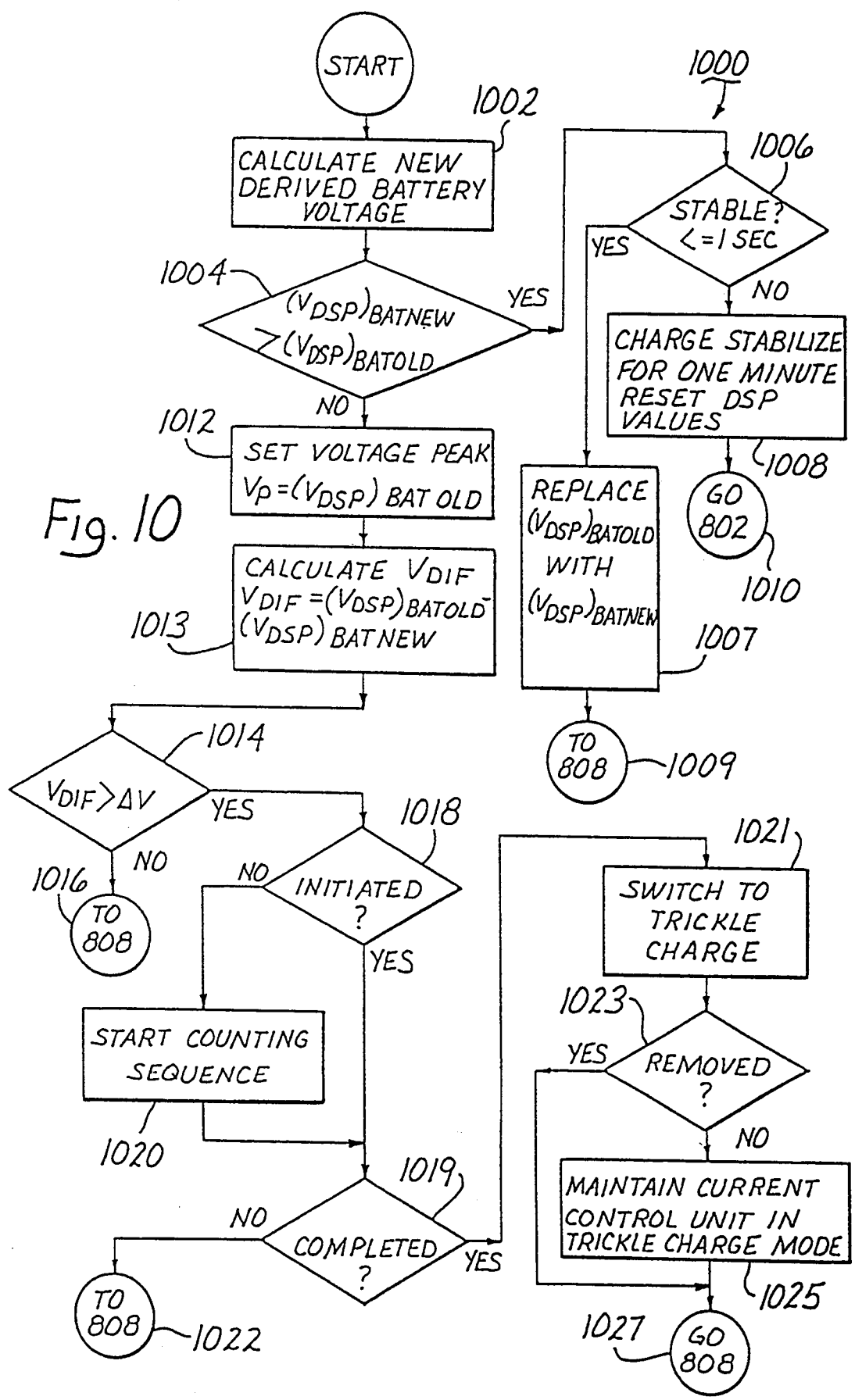

In FIGS. 6 and 7, a pair of more detailed flowcharts illustrate the steps executed by the microprocessor 74. Included in FIGS. 6 and 7, are separate subroutines, any one of which is called in response to a change in state of an associate battery parameter as will be explained hereinafter in greater detail. Flowcharts illustrating the steps executed by the microprocessor 74 of FIG. 3 for each of the subroutines are illustrated in FIGS. 8–10.

Referring now to the flowchart of FIG. 6, the program begins on a start instruction 503, INSERT BATTERY IN ADAPTER. Thereafter, a decision instruction 602 is executed to cause a determination to be made, as to whether the inserted battery is defective in an electrically shorted condition. If the battery is shorted, the program branches to an instruction 604 which causes the unit 12 to switch to a trickle charge mode and generates a signal indicative that the battery gas an electrical short. The program remains at instruction 604 until the battery is removed from the unit 12. Removing the battery from the unit 12, causes the processor to return to the STANDBY mode at the instruction box 502 (FIG. 5).

If the battery does not exhibit a short condition, a decision instruction 603 is then executed to cause the processor 74 to execute thereafter a mode selection subroutine shown generally at 504 in FIG. 5. In this regard, in decision instruction 603, a determination is made whether the system 10 has an automatic mode selection feature or a user selected mode feature. If the system 10 has a user selection feature, the program branches through one or more of a group of decision instructions 604, 606 and 608 to determine which feature has been selected by the user. If the system 10 does not have a user selection feature, the program advances to instruction 610 as will be explained hereinafter in greater detail.

When the program advances to decision instruction 604, a determination is made whether the user has selected the CONDITION mode of operation. If the user has selected the CONDITION mode of operation, the program goes to instruction 605, otherwise the program proceeds to instruction 606. Instruction 605 causes the unit 12 to discharge the battery until the battery potential reaches a predetermined voltage level. At instruction 605, a signal is also generated to indicate that the battery is being discharged. After the battery potential has reached the predetermined voltage level, the processor advances from instruction 605 to instruction 610.

By executing instruction 610, the microprocessor 74 causes the unit 12 to switch from a discharge mode to a charge mode of operation, and to generate a signal indicative that the battery is being charged. The processor then proceeds to a decision instruction 612 where a determination is made whether the battery has been charged to a predetermined voltage value within a predetermined period of time. If not, the battery is defective and the program returns to instruction 604 as previously described.

If the predetermined voltage value is established, an instruction 614 is executed, and the processor continues to enable the unit 12 to supply the battery with a high rate of charging current. A signal is also generated to indicate that the battery is still being conditioned in the charge mode. The program remains at instruction 614 until a peak battery potential value $V_P$ is established. When a peak battery potential value $V_P$ is established, the processor executes a decision instruction 616.

When the processor advances to the decision instruction 616, it determines whether a predetermined voltage drop $\Delta V$ from the peak voltage value $V_P$ has occurred. The expected voltage drop $\Delta V$ is a function of the number of cells contained in the given battery. A preferred voltage drop is between about 22 millivolts per cell and about 18 millivolts per cell. A more preferred voltage drop is between about 21 millivolts per cell and about 19 millivolts per cell. A most preferred voltage drop would be about 20 millivolts per cell.

If the predetermined voltage drop $\Delta V$ has not occurred, the processor loops between instructions 614 and 616 until the voltage drop has been verified for a predetermined period of time T (FIG. 4). The predetermined period of time T is between about 1 minute and about 15 minutes. A more preferred period of time T is between about 3 minutes and about 10 minutes, and a most preferred period of time T is about 5 minutes.

When the voltage drop has been verified for the predetermined period of time T, the processor advances to an instruction 618 which causes the unit 11 to be switched to a trickle charge. In instruction 618, a signal is also generated indicative that the battery is fully charged and ready to be removed from the unit 11. When the user removes the battery from the unit 12, the program goes to instruction 620 which resets the system 10, thereby causing the system 10 to be placed in the STANDBY mode waiting for another battery to be inserted into the conditioning and charging unit 12.

If a determination is made by the execution of an instruction 604 that the user has not selected the CONDITION mode of operation, the processor proceeds to the decision instruction 606. In decision instruction 606, a determination is made whether the user has selected the CHARGE mode of operation. If the user has not selected the CHARGE mode of operation, the processor then executes decision instruction 608 as will be explained hereinafter.

Referring now to decision instruction 606, if the user has selected the CHARGE mode of operation, the processor advances to an instruction 607 which causes the unit 12 to start charging the battery. In instruction 607, a signal is also generated to indicate that the system 10 is operating in the CHARGE mode of operation. Once charging of the battery is commenced, the processor advances to a decision instruction 622 to determine whether the battery has been charged to a given predetermined battery potential level within a given period of time. If the battery is not charged to the predetermined level within the given period of time, the battery is determined to be defective, and the processor branches to an instruction 624 which causes the unit 12 to switch to a trickle charge mode and for a signal to be generated that the battery is defective. The processor remains in box 624 until a user removes the battery from the unit 12, the processor advances to instruction 620 and proceeds as previously described; e.g. the system 10 returns to the STANDBY mode waiting for another battery to be inserted.

Should the battery be charged to the predetermined level in decision box 622, an instruction 626 is then executed to cause the unit 12 to continue to supply the battery with a high rate charge current following the predetermined potential value. A charge signal is also generated that is indicative that the battery is continuing to be charged.

The processor remains at instruction 626 until the battery potential reaches a peak potential value $V_P$. When a peak potential value $V_P$ is encountered, the processor then executes a decision instruction 628 to determine whether a predetermined voltage drop $\Delta V$ from the peak voltage value $V_P$ has occurred. If not, the processor loops between instructions 626 and 628 until a voltage drop of at least $\Delta V$ has been verified for a predetermined period of time T. The predetermined period of time T is between about 1 minute and about 15 minutes. A more preferred period of time T is between about 3 minutes and about 10 minutes, and a most preferred period of time T is about 5 minutes.

When the voltage drop ΔV has remained equal to or greater than a predetermined value for the fixed predetermined period of time T, the processor advances to instruction 618 and proceeds as previously described.

Referring again to decision instruction 606, if the user has not selected the CHARGE mode of operation, the program proceeds to the decision instruction 608 to determine whether the user has selected the ANALYZE mode of operation. If the user has not selected the ANALYZE mode of operation, the processor exits the current routine and advances to a default subroutine (not shown).

described. If the battery is discharged properly, the program advances to a decision instruction 642 which causes a counter to be set which is indicative of the number of times the battery is to be charged and discharged for analysis purposes.

As best seen in FIG. 5, the battery being analyzed is charged and discharged three consecutive times. It will be understood by those skilled in the art, that greater or lesser periods could also be utilized by analysis purposes.

Also at instruction box 640, different predetermined default voltage levels are set so that when the battery is charged and discharged a second or third time, it is charged and discharged to different predetermined levels. The following table indicates the various charging and discharging default levels.

| DEFAULT LEVELS | VOLTAGE LEVELS | | |
|---|---|---|---|
| | MOST PREFERRED LEVEL | MORE PREFERRED RANGE | PREFERRED RANGE |
| FIRST DEFAULT DISCHARGE LEVEL | 1.2 VOLTS/CELL | 1.1 VOLTS/CELL TO 1.3 VOLTS/CELL | 1.0 VOLTS/CELL TO 1.4 VOLTS/CELL |
| FIRST DEFAULT CHARGE LEVEL | 1.0 VOLTS/CELL | 0.9 VOLTS/CELL TO 1.1 VOLTS/CELL | 0.8 VOLTS/CELL TO 1.2 VOLTS/CELL |
| SECOND DEFAULT DISCHARGE LEVEL | 1.2 VOLTS/CELL | 1.1 VOLTS/CELL TO 1.3 VOLTS/CELL | 1.0 VOLTS/CELL TO 1.4 VOLTS/CELL |
| SECOND DEFAULT CHARGE LEVEL | 1.0 VOLTS/CELL | 0.9 VOLTS/CELL TO 1.1 VOLTS/CELL | 0.8 VOLTS/CELL TO 1.2 VOLTS/CELL |
| THIRD DEFAULT DISCHARGE LEVEL | 1.2 VOLTS/CELL | 1.1 VOLTS/CELL TO 1.3 VOLTS/CELL | 1.0 VOLTS/CELL TO 1.4 VOLTS/CELL |
| THIRD DEFAULT CHARGE LEVEL | 1.0 VOLTS/CELL | 0.9 VOLTS/CELL TO 1.1 VOLTS/CELL | 0.9 VOLTS/CELL TO 1.2 VOLTS/CELL |

In decision instruction 608, if the user has selected the ANALYZE mode of operation, the processor executes instruction 609 and thereby causes a signal to be generated indicative that the system 10 is operating in the ANALYZE mode of operation. The processor 74 also causes the unit 12 to start charging the battery. The processor then proceeds to an instruction 630 for charging the battery to a first predetermined level. If the battery fails to be charged to the first predetermined level the program branches to instruction 624 and proceeds as previously described.

If the battery is charged to the first predetermined level, the program advances to an instruction 632 and a decision instruction 634 which are substantially similar to instructions 626 and 628 respectively. After the battery potential drop has been verified for the predetermined period of time the program proceeds to instruction 636 which causes the unit 11 to discharge the battery and causes a signal to be generated that the battery is being discharged.

The processor then advances to a decision instruction 638 to determine whether the battery potential has dropped to a second predetermined voltage level. If the battery is not discharged to the second predetermined level with a predetermined period of time the program branches to instruction 624 and proceeds as previously The program then proceeds to decision instruction 642 to determine whether the counter has been incremented the desired number of time corresponding to the desired number of charging nd discharging cycles. If the counter has not been incremented to the desired level, the processor loops back to instruction 609 and proceeds as previously described. If the counter has been incremented to the desired level, the processor executes instruction 620 and proceeds as previously described.

As previously mentioned, the battery charging system 10 includes a group of current control circuits, such as the circuits 22, 23 and 24. In this regard, the microprocessor 74 controls the analog to digital converter 72 at a predetermined sampling rate to permit each of the control circuits to be operated independently. In this regard, a background program, shown generally at 800, permits (FIG. 8) the potential value of each battery being charged to be monitored. As will be explained being charged to be monitored. As will be explained hereinafter in greater detail, as the potential of each battery is being monitored, the processor 74 periodically calculates the instantaneous battery potential values and corrects derived battery potential values. More particularly, the processor determines relative to each battery being charted determines an instantaneous reference voltage value, an instantaneous ground reference value, and an instantaneous battery potential value and then calculates the derived battery potential value $V_d$ using the previously derived results.

Considering now the background program 800 in greater detail with reference to FIG. 8, the background program 800 is automatically initiated each time a battery is inserted into the battery conditioning and charge unit 12, and causes the analog to digital converter 72 to monitor the battery potential value of each battery being charged. In this regard, as best seen in FIG. 8, the microprocessor 74 starts by executing an instruction 802 to generate a STRT signal for activating the analog to digital converter 72. The processor 74 then executes an instruction 804 to wait for the capacitor 77 to discharge in response to a particular instantaneous reference, such as the reference voltage, the battery potential, or a ground reference. When the capacitor 77 is fully discharged, the analog to digital converter 72 generates a CMP signal which enables the processor to advance to an instruction 806 which calls a RECORD subroutine 900 for enabling the microprocessor 74 to record the instantaneous value of the monitored signal reference. After the monitored signal has been recorded, an instruction 808 is then executed to enable the signal to be sampled and recorded by causing the analog to digital converter 72 to be readdressed for sampling another battery condition signal, such as VBAT1.

Considering now the RECORD subroutine 900 in greater detail with reference to FIG. 9, the RECORD subroutine 900 starts in instruction 902 when the digital signal is received by the microprocessor 74. The RECORD subroutine 900 thus starts when the microprocessor 72 executes the instruction 902 and records the instantaneous value of the digitized reference potential value. For the purpose of recording the instantaneous reference value, the microprocessor 74 causes a binary count ($N_{INST}$) VREF, derived from an internal counter within the microprocessor 74, to be stored therein. In this regard, whenever the analog to digital converter 72 generates a CMP signal, the microprocessor 74 terminates its counting sequence and temporarily stores the count ($N_{INST}$) VREF.

After recording the instantaneous value in instruction 902, the program proceeds to a decision instruction 903 to determine whether all the necessary instantaneous values of the reference voltage, ground, and battery voltage have been recorded. If all values have been recorded the program goes to instruction 910 which calls a CALCULATE subroutine 1000 which will be described hereinafter in greater detail. After the CALCULATE subroutine 1000 is executed the microprocessor executes an instruction 911 which returns the program to instruction 808. If all three values have not been recorded, the microprocessor then executes an instruction 904 which causes the recorded instances value to be algebraically manipulated through a linear time varying causal equation of the type $Y_n = a*X + b*Y_0$ for helping to reduce, if not substantially eliminating, all voltage aberration from the instantaneous value. More particularly, the following algorithm is utilized by the program:

$Y_n = (N_{DSP})VREFNEW =$ new instantaneous voltage value filtered relative to reference voltage 2.5 volts;

$a = 31/32 =$ Arbitrary coefficient for matching time constants (steady state), to eliminate aberrations;

$X = (N_{DSP})VREFOLD =$ Previously stored derived voltage value relative to reference voltage of 2.5 volts;

$Y_o = (N_{INST})VREF =$ The binary count of the present instantaneous voltage value relative to the reference voltage of 2.5 volts.

$b = 1/32 =$ Arbitrary coefficient for matching time constants (steady state) to eliminate abberations Thus, the new filtered instantaneous voltage value for the reference voltage is expressed as:

$$(N_{DSP})VREFNEW = \frac{31}{32} * (N_{DSP})VREFOLD + \frac{1}{32} * (N_{INST})VREF$$

where DSP is indicative of the digital signal processing for eliminating voltage aberrations.

Once ($N_{DSP}$)VREFNEW has been calculated in instruction 904, the microprocessor 74 executes an instruction 906 which causes the binary filtered value $Y_n$ to be translated into a decimal format and then temporarily stored for calculation purposes. The microprocessor 74 also causes the STRT signal to go to a logical LOW level so the capacitor 77 will be able to be charged again. After the filtered value $Y_n$ has been stored, the microprocessor 74 executes an instruction 912 which returns the program to instruction 802.

When the program returns to instruction 802 the microprocessor 74 once again causes the STRT signal to go to a logical HIGH level enabling the capacitor 77 to once again be discharged. During the period the capacitor 77 is being discharged the microprocessor is counting a second measuring sequence relative to the ground reference. In this regard, when the microprocessor 74 receives a CMP signal from the analog to digital converter, the microprocessor 74 executes the instruction 806 which causes the RECORD subroutine 900 to be called again.

The RECORD subroutine 900 proceeds as previously described except the microprocessor now temporarily stores a second binary count ($N_{DSP}$)GNONEN indicative of an instantaneous value relative to ground rather than the 2.5 volt reference. As this is only the second value recorded when the microprocessor executes instruction 903 the program branches to the instruction 904. When the microprocessor causes the instruction 904 to be executed, it causes the instantaneous value relative to ground to be recorded using the same basic equation. In this regard however, the algorithm results are different because of the different reference value. More particularly, the new filtered instantaneous value relative to ground is expressed as $$(N_{DSP})GNDNEW = \frac{31}{32} * (N_{DSP})GNDOLD + \frac{1}{32} * (N_{INST})GND$$

where:

$Y_{n1} = (N_{DSP})GNDNEN =$ New instantaneous voltage value filtered relative to ground;

$a = \frac{31}{32} =$ Arbitrary coefficient for matching time constants (steady state) to eliminate abberations;

$X = (N_{DSP})_{GNDOLD} =$ Previously stored derived voltage value relative to ground reference;

$b = \frac{1}{32} =$ Arbitrary coefficient for matching time constants (steady state) to eliminate abberations;

$Y_o = (N_{INST})_{GND} =$ The binary count of the present instantaneous voltage value relative to a ground reference.

Once $(N_{DNSP})_{GNDNEN}$ has been calculated in instruction 904, the microprocessor executes the instruction 906 which causes the binary filtered value $Y_{n1}$ to be translated into a decimal format and temporarily stored. Also at instruction 906 the microprocessor 74 drops the STRT signal to a logic LOW level enabling the capacitor 77 to again be charged.

After the second filtered value relative to ground $Y_{n1}$ has been stored, the microprocessor 74 executes the instruction 912 as previously described.

When the program returns to instruction 802 a third time, the microprocessor 74 causes the STRT signal goes to a logical HIGH level and commences a new instantaneous battery voltage counting sequence. The microprocessor 74 then executes the instruction 804 to wait for the analog to digital converter 72 to generate another CMP signal.

When the CMP signal is generated by the analog to digital converter 72, the microprocessor causes the instruction 806 to be executed calling the RECORD subroutine 900. In this regard, the program executes instruction 902 and records a new instantaneous battery voltage count $(N_{INST})_{BAT}$ relative to the VBAT signal and advances to the decision instruction 903. As all three sample values, (2.5 volts, ground and VBAT) have been recorded, the count is now set at three and the program branches to the instruction 910 which calls the CALCULATE subroutine 1000.

Considering now the CALCULATE subroutine 1000 in greater detail with reference to FIG. 10, the CALCULATE subroutine 1000 starts at an instruction 1002 where a new derived battery voltage $V_d$ or $(V_{DSP})_{BAT-NEW}$ using the following algorithm base on the same basic linear formula $y_n = a*X + b*y_o$ but scaled and modified for correcting normal system deviations. In this regard, $V_d$ is calculated using the following equation:

$$V_d = 2.5 * 7.8 \left[ \frac{(N_{DSP})_{BATNEW} - (N_{DSP})_{GNDNEW}}{(N_{DSP})_{REFNEW} - (N_{DSP})_{GNDNEW}} \right]$$

where $(N_{DSP})_{GNDNEW} = \frac{31}{32} * (N_{DSP})_{GNDOLD} + \frac{1}{32} * (N_{INST/GND})$ $(N_{DSP})_{REFNEW} = \frac{31}{32} * (N_{DSP})_{REFOLD} + \frac{1}{32} * (N_{INST})_{REF}$ $(N_{DSP})_{BATNOW} = \frac{31}{32} * (N_{DSP})_{BATOLD} + \frac{1}{32} * (N_{INST})_{BAT}$ 2.5 = reference voltage value 7.8 = resistor divider network ratio (input of analog to digital converter 72)

After the new derived voltage is calculated the microprocessor 74 executes a decision instruction 1004 to determine whether the new derived battery voltage $(V_{DSP})_{BATNEW}$ has a greater value than the previously stored derived battery voltage $(V_{DSP})_{BATOLD}$. If the new derived battery voltage is greater, the program branches to a decision instruction 1006 which determines whether the instantaneous derived battery voltage $V_d$ is stable. In this regard, the microprocess compares the newly calculated derived voltage with a pan of set point values that have a range between about 0.6 volts and about 28 volts. If the newly calculated derived voltage is outside the preferred range the battery is considered constable. Accordingly, the microprocessor enters a timing loop of about 0.01 second to about 2.0 seconds for allowing the derived to be stablized. A mere preferred time period in between about 0.5 seconds and about 1.5 seconds. A most preferred time period is about 1.0 seconds. If the instantaneous derived battery voltage $V_d$ has been stable for about 1.0 seconds, the microprocessor 74 executes an instruction 1007 and causes the previously stored derived voltage $(V_{DSP})_{BATOLD}$ to be replaced with the new derived battery voltage $(V_{DSP})_{BATNEW}$. The microprocessor 74 then executes a return instruction 1009, which returns the program to instruction 808 for enabling a new battery condition signal such as VBAT1 to be sampled.

If the new derived battery voltage is not greater than the old derived battery voltage the microprocessor 74 executes an instruction 1012 which causes the peak voltage value $V_p$ to be set equal to the old derived battery voltage $(V_{DSP})_{BATOLD}$. After setting $V_p$ the microprocessor 74 executes an instruction 1013 which calculates a voltage difference $V_{DIF}$ between the peak battery voltage $V_p$ and the new derived battery voltage $(V_{DSP})_{BATNEW}$ or $V_d$. The microprocessor 74 then executes a decision instruction 1014 to determine whether the voltage difference $V_{DIF}$ is greater than a previously stored setpoint value $\Delta V$.

If the value of $V_{DIF}$ is not greater than $\Delta V$, the peak voltage $V_p$ is considered to be a false peak voltage. In this regard, the program advances to instruction 1016 which returns the program back to instruction 1008 where it proceeds as previously described to verify whether $V_p$ was a true peak value voltage.

If the value of $V_{DIF}$ is greater than $\Delta V$, the peak voltage $V_p$ is considered to be a valid peak voltage. In this regard, the microprocessor 74 executes a decision instruction 1018 to determine a timing sequence (TSEQ) in the microprocessor 74 has been initiated. If the sequence has not been initiated, the microprocessor executes an instruction 1020 which set an initiation flag TSEQ and causes a counting sequence to be started by the microprocessor 74. This counting sequence takes between about 1 minute to about 15 minutes to complete. A more preferred time to complete the count is between about 3 minutes to about 10 minutes. A most preferred time to complete the counting sequence is about 5 minutes. After the counting sequence is started the microprocessor 74 executes a decision instruction 1019 to determine whether the counting sequence has been completed. If the sequence has not been completed (TSEQ a logic HIGH level) the program goes to an instruction 1022 which returns the program to instruction 808 to start another sampling period.

If the timing sequence had already been commenced in instruction 1018 the microprocessor 74 immediately executes the decision instruction 1019 to determine whether the counting sequence has been completed (TSEQ a logical LOW level). If the counting sequence is completed, the processor executes an instruction 1021 which causes the current control circuit whose battery voltage is presently under evaluation to be switched to a trickle charge mode. The microprocessor 74 then executes a decision instruction 1023 to determine whether the battery has been removed from the charging and conditioning unit 12. If not, the program branches to an instruction 1025 which causes the given current control circuit to be maintained in a trickle charge mode until the battery is removed. The microprocessor 74 then executes a return instruction 1027, which returns the program to instruction 808. If the battery has been removed when the program is in the decision instruction 1023, the program goes directly to instruction 1027 and proceeds as previously described.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of conditioning a battery, comprising:
   applying a high discharge current to the battery;
   generating a conditioned signal continuously;
   converting said conditioned signal into a digital signal indicative of a present potential value of the battery;
   responding to said digital value by calculating periodically a derived battery potential value indicative of an averaged present potential value of the battery;
   determining whether said averaged present potential value is a predetermined discharged battery potential value;
   applying a high charge current to the battery when said averaged present potential value is substantially equal to said predetermined discharged battery potential value;
   determining whether said averaged present potential value is a peak potential value;
   storing said derived battery potential value when said averaged present potential value is the peak potential value;
   responding to said digital signal by calculating periodically an incremental derived battery potential value relative to the stored peak potential value;
   determining whether said incremental derived battery potential value is greater than or equal to a predetermined incremental battery potential value;
   starting a timer in response to said incremental derived battery potential value being greater than or equal to said predetermined incremental battery potential value;
   repeating said steps of generating, converting, responding, determining, applying, determining, storing, responding and determining;
   resetting said timer if said derived battery potential value is the peak potential value;
   resetting said timer in response to said incremental derived potential value having a potential value less than said predetermined incremental battery potential value; and
   switching from applying said high charge current to the battery to applying a trickle charge current when said timer completes a predetermined counting sequence.

2. A method of conditioning a battery according to claim 1, further comprising:
   determining whether the battery has been charged to a predetermined charged potential value within a predetermined period of time; and
   generating a battery fault signal if the battery is not charged to said predetermined charged potential value within said predetermined time.

3. A method of analyzing a battery, comprising:
   inserting the battery into a battery charger adapter coupled to a battery charger for enabling a charging current to be applied to the battery, said battery charger having fast charge means for applying a fast charge current to the battery and slow charge means for applying a trickle charge current to the battery, conditioning means coupled to the battery for generating a digital signal indicative of a present potential value of the battery, processor means responsive to said conditioning means for calculating periodically a derived battery potential value indicative of an averaged potential value of the battery, said processor means including means for calculating periodically an incremental derived potential value relative to a derived peak potential value of the battery and timing means for causing the charging current to be decreased from said fast charge current to said trickle charge current after a predetermined period of time during which said incremental derived potential value does not become less than a predetermined incremental value;
   discharging the battery until said derived battery potential value is substantially equal to a predetermined discharged potential value;
   charging the battery until said derived battery potential value is substantially equal to a predetermined charged potential value;
   discharging the battery until said derived battery potential value is substantially equal to another predetermined discharged potential value;
   charging the battery until said derived battery potential value is substantially equal to another predetermined charged potential value;
   discharging the battery until said derived battery potential value is substantially equal to a predetermined final discharged potential value;
   charging the battery until said derived potential value is substantially equal to a predetermined final charged potential value; and
   applying a trickle charging current to the battery until it is removed from said battery charger adapter.

4. A method of analyzing a battery according to claim 3, wherein the last mentioned charging step includes:
   determining whether said derived battery potential value is a peak battery potential value $V_p$;
   determining whether said derived battery potential value has decreased from said peak battery potential value $V_p$ by a predetermined potential drop $\Delta V$.

5. A method of analyzing a battery according to claim 4, wherein said predetermined potential drop $\Delta V$ is between about 22 millivolts per cell and about 18 millivolts per cell.

6. A method according to claim 5, wherein a more preferred predetermined potential drop $\Delta V$ is between about 21 millivolts per cell and about 19 millivolts per cell.

7. A method according to claim 6, wherein a most preferred predetermined potential drop $\Delta V$ is about 20 millivolts per cell.

8. A method of analyzing a battery according to claim 4, further comprising:

verifying for said predetermined period of time T that said derived battery potential value has decreased from said peak battery potential value to said predetermined potential drop $\Delta V$.

9. A method of analyzing a battery according to claim 8, wherein said predetermined period of time T is between about 1 minute and about 15 minutes.

10. A method of analyzing a battery according to claim 9 wherein a more preferred predetermined period of time T is between about 3 minutes and about 10 minutes.

11. A method of analyzing a battery according to claim 10 wherein the most preferred predetermined period of time T is about 5 minutes.

12. A method according to claim 3, further comprising:

generating a signal indicative that the battery is fully charged.

13. A method according to claim 3, wherein said first mentioned predetermined discharged potential value is between about 1.0 volts per cell and about 1.4 volts per cell.

14. A method according to claim 13, wherein a more preferred said first mentioned predetermined discharged potential value is between about 1.1 volts per cell and about 1.3 volts per cell.

15. A method according to claim 14, wherein a most preferred said first mentioned predetermined discharged potential value is about 1.2 volts per cell.

16. A method according to claim 15, wherein said predetermined discharged potential value, said another predetermined discharged potential value, and said predetermined final discharged potential value are substantially the same potential value.

17. A method according to claim 3, wherein said first mentioned predetermined charged potential value is between about 1.2 volts per cell and about 0.8 volts per cell.

18. A method according to claim 17, wherein a more preferred said first mentioned predetermined charged potential value is between about 1.1 volts per cell and about 0.9 volts per cell.

19. A method according to claim 18, wherein the most preferred said first mentioned predetermined charged potential value is about 1.0 volts per cell.

20. A method according to claim 19, wherein said predetermined charged potential value, said another predetermined charged potential value and said predetermined final charged potential value are substantially the same potential value.

* * * * *